United States Patent [19]

Pavlov et al.

[11] Patent Number: 4,925,746

[45] Date of Patent: May 15, 1990

[54] DEVICE FOR RECOMBING HYDROGEN AND OXYGEN RELEASED IN LEAD-ACID STORAGE BATTERIES

[75] Inventors: Dechko Pavlov; Todor V. Donchev; Ivan P. Nikolov; Veneta I. Nikolova; Geno P. Papazov; Konstantin M. Petrov, all of Sofia, Bulgaria

[73] Assignee: Zentralna la Boratoria Po Elektrochimicheski Iztochnici Na Tok, Sofia, Bulgaria

[21] Appl. No.: 183,798

[22] Filed: Apr. 20, 1988

Related U.S. Application Data

[63] Continuation-in-part of Ser. No. 109,382, Oct. 15, 1987, abandoned.

[51] Int. Cl.$^5$ .................... H07M 10/34; B01J 31/00
[52] U.S. Cl. ......................................... 429/57; 429/7; 429/59; 502/152; 502/177
[58] Field of Search ................... 429/1, 7, 57, 59; 502/152, 177

[56] References Cited

U.S. PATENT DOCUMENTS

| | | | |
|---|---|---|---|
| 3,790,410 | 2/1974 | Mund et al. | 502/177 X |
| 4,172,808 | 10/1979 | Böhm et al. | 502/177 |
| 4,810,598 | 3/1989 | Levy et al. | 429/57 X |

FOREIGN PATENT DOCUMENTS

| | | | |
|---|---|---|---|
| 49-25574 | 7/1974 | Japan | 429/59 |
| 49-33817 | 9/1974 | Japan | 429/59 |
| 54-15140 | 2/1979 | Japan | 429/59 |

Primary Examiner—Stephen J. Kalafut
Attorney, Agent, or Firm—Klein & Vibber

[57] ABSTRACT

A device for recombining hydrogen and oxygen released in maintenance-free lead-acid storage batteries as well as their electrochemical conversion is composed of electrodes employed in a stack enveloped in a sheath of microporous material with the individual electrodes also being separated by such material. The device may be employed in sealed storage batteries when connected through a diode to the negative pole of a cell of the battery. A stack of electrodes may be divided in two parts, one part connected through a diode to the negative pole and the other part connected through a diode and a resistor to the positive pole, at which time the device is immersed partially in the electrolyte of the cell. The electrodes contains a catalyst from a combination of tungsten carbide and the active or activate carbon and a polymeric binder on a support grid of lead or lead alloy, the catalyst/binder mixture having been pressed onto the support grid or forming two layers situated at the surfaces of the electrode. Between these two catalytic layers a third layer composed of carbon black and binder, and containing the support grid, is situated.

11 Claims, 3 Drawing Sheets

DEVICE FOR RECOMBING HYDROGEN AND OXYGEN RELEASED IN LEAD-ACID STORAGE BATTERIES

This application is a continuation-in-part of application Ser. No. 109,382 filed Oct. 15, 1987 now abandoned.

FIELD OF THE INVENTION

This invention refers to a device for recombining and electrochemically converting hydrogen and oxygen released in lead-acid storage batteries with the aim of making the batteries maintenance-free and suitable for sealing.

BACKGROUND OF THE INVENTION

Different devices for recombining hydrogen and oxygen which are of use with sealed lead-acid batteries are known from, for example, U.S. Pat. No. 3,630,778 and German Offenlegungsschrift No. 31 22 659. These devices are essentially catalyst cartridges mounted in the gas chamber or in the lid of the storage batteries, although in a few cases they are catalyzed partially immersed electrodes that are connected through diodes to the basic electrodes in the storage battery. (See for example P. Ruetschi and J. Oskerman, Electrochem. Techn. 4 (1966) 383 and Japanese Patent No. 4925574.)

A characteristic feature of all such recombination devices is that noble metal catalysts (platinum, palladium, ruthenium) are used in their manufacture. These catalysts are very active and the devices recombine the released gases at a high rate.

The high activity of the noble metal catalysts gives rise to certain drawbacks. Even insignificant amounts of the ions of these metals which are dissolved from the catalyzed partially immersed electrodes in the electrolyte and which lead to deposition of the noble metals on the plates of the storage battery reduce the overvoltage of hydrogen and oxygen. This phenomenon gives rise to a very strong battery self discharge accompanied by gas release complicating the operation of the recombination device, and a corresponding sulphatizing and swelling of the negative plates takes place. Moreover, some of the surface active substances used as expanders or additives in battery plates may poison the platinum or palladium strongly reducing their catalytic effect and thereby reducing the efficiency of the recombination device. It is for this reason that the catalytic part of such devices is usually mounted in the gas chamber of the lead-acid batteries. This enables the direct contact of the catalyst with the electrolyte to be avoided and reduces the likelihood of noble metal ions entering the electrolyte. However, other drawbacks arise out of such construction owing to the specificity of operation in the gaseous phase.

First of all, the catalytic cartridges combine hydrogen and oxygen under these conditions in a stoichiometric ratio (2:1) while excess amounts of one or other of these gases remain uncombined and have to be released into the atmosphere, which makes sealing of the batteries impossible. During charging of the lead-acid batteries the two gases are, in fact, released in amounts that are not stoichiometric.

The second drawback of catalyst cartridges operating in the gaseous phase is the temperature rise which results from the exothermic recombining reaction. This can cause an explosion of the hydrogen-oxygen mixture and therefore it is necessary to take preventive measures. (See U.S. Pat. No. 3,630,778.)

All these drawbacks of prior art partially immersed recombination devices along with the high price of noble catalysts explain why up to now the above devices for recombination of hydrogen and oxygen have not been used in practice.

In German Patent No. DE 2312131 and French Patent FR No. 2074519, electrodes with non-noble metal catalysts for hydrogen oxidation containing carbon black, tantalum powder or silver powder and tungsten carbide with grain size from 0.5 to 1 m are described. These electrodes are designed only for oxidation of the hydrogen released from the negative plates of the lead-acid battery, while a change in the construction of the battery cells so that no oxygen release would take place, is recommended. Actually the oxygen evolution from the positive plates starts when about 70–80% state of charge has been reached. Thus, oxygen evolution can be avoided when the positive paltes remain 20–30% uncharged. (See for example, "Power Sources for Electric Vehicles", Ed. B. D. McNicol and D. R. J. Rand, Elsevier, Am., 1984 p. 422). According to French Patent FR No. 2074519, the battery is termed "low maintenance", which means that during operation it is necessary for it to be refilled with water which significantly reduces the role of the recombination device.

SUMMARY OF THE INVENTION

According to the present invention, a device for recombining hydrogen and oxygen released in a lead-acid storage battery, as well as their electrochemical conversion, comprises stacks of catalytically active electrodes which consist of a combination of catalyst for both the hydrogen and the oxygen reactions (tungsten carbide as such or as a mixture of tungsten carbide and activated or active carbon) and binder, pressed on a support grid of lead or lead alloy, enveloped in a microporous sheath, each electrode being separated from its neighbour(s) by a microporous sheet material and the electrode stack is divided in two parts, one being connected to the negative pole of a lead-acid storage battery by means of a diode, and the other to the positive pole by means of a diode and a resistor, or the whole stack being connected by means of a diode to the negative pole only.

When the stack is partially immersed in the electrolyte of the cell, its potential or the potentials of its two parts are kept in the range from +0.1 to +0.5 V versus a hydrogen electrode in the same solution.

The catalyst of the electrodes is tungsten carbide as such or as a mixture of tungsten carbide and active carbon or a mixture of tungsten carbide and carbon activated by a metal-chelate compound or products of the thermal treatment thereof in a non-oxygen containing medium at temperatures of 300° to 1000° C. The metal-chelate compounds, preferably porphirins or annulenes are employed in amounts of up to 20% by weight of the carbon.

The polymeric binder or binder/carbon or binder/carbon black combination for example polytetrafluorethylene, polytrifluorethylene, polyethylene, polypropylene or polyisobutylene, or carbon black to which a binder as aforesaid has been added constitutes from 5% to 60% by weight of the total mixture amount, according to Bulgarian Pat. No. 16152.

The catalyst is distributed homogeneously in the electrode, the catalyst/binder mixture being pressed onto the lead or lead alloy support grid at preferably from 50° to 400° C. in an amount of from 0.01 to 1 g/cm$^2$, or the catalyst/binder mixture forming two layers situated at the two surfaces of the electrode. Between these surface layers there is a carrier layer constituted of carbon black in amounts from 5 to 60% and polymeric binder, in which layer the lead or lead alloy support grid is situated. These three-layer electrodes are formed by pressing at a temperature of preferably from 50° to 400° C.

The electrode stack of the device is wrapped in a microporous separator such as is used in the manufacture of lead-acid batteries, the separator being formed for example of polyvinylchloride or polyethylene or polypropylene, or of a latex-formaldehyde resin, with the electrodes also being separated from each other by such separator material.

The device of the invention for recombining hydrogen and oxygen released in lead-acid storage batteries is effective for the following reasons: it catalyzes the recombination reaction between hydrogen and oxygen, the electrochemical oxidation of hydrogen, and it maintains a potential at which both the hydrogen and the oxygen reactions can proceed at high rates.

During operation, lead-acid batteries pass through periods of charge, discharge, or open circuit. At each of these modes, the rates of hydrogen and oxygen evolution are different. During overcharge, hydrogen and oxygen are evolved in stoichiometric ratios 2:1. These gases recombine into water and the device potential is maintained at +0.3 ±0.1 V vs. a hydrogen electrode in the same solution.

During battery charge when the positive plate reaches 70–80% state of charge oxygen evolution starts, while hydrogen is evolved when the negative plate is fully charged. Thus, during the last period of charging, the excess amount of oxygen over the stoichiometric quantity versus hydrogen is combined by current flow through this part of the device which is connected to the negative pole of the battery cell and for the last process to proceed at a high rate, the device potential has to be in the range between 0.1 and 0.3 V versus a hydrogen electrode.

When the battery stays at open circuit, the rate of hydrogen evolution at the negative plate is much higher than that of oxygen evolution at the positive plate, especially when the grids are made of lead-antimony alloys. This excess amount of hydrogen is consumed by that part of the device which is connected to the positive pole of the battery cell and for the last process to proceed at a high rate, the device potential has to be in the range between 0.3 and 0.5 V versus a hydrogen electrode.

As a result of maintenance of such operating conditions, the device does not heat up appreciably, so that there is no danger of explosion of the hydrogen-oxygen mixture accumulating in the gas chamber of the storage battery.

The tungsten carbide serving as catalyst is practically insoluble in sulphuric acid solutions. However, should tungsten ions pass into the electrolyte and reach the plates of the storage battery, they do not substantially affect the release of gas because they are deposited on these plates in the form of tungsten which is not a good catalyst for the hydrogen and oxygen producing reactions.

BRIEF DESCRIPTION OF THE DRAWINGS

With these and other objects in view, which will become apparent in the following detailed description, the present invention, which is shown by example only, will be clearly understood in connection with the accompanying drawing, in which.

DESCRIPTION OF THE PREFERRED EMBODIMENTS

Figure 1:
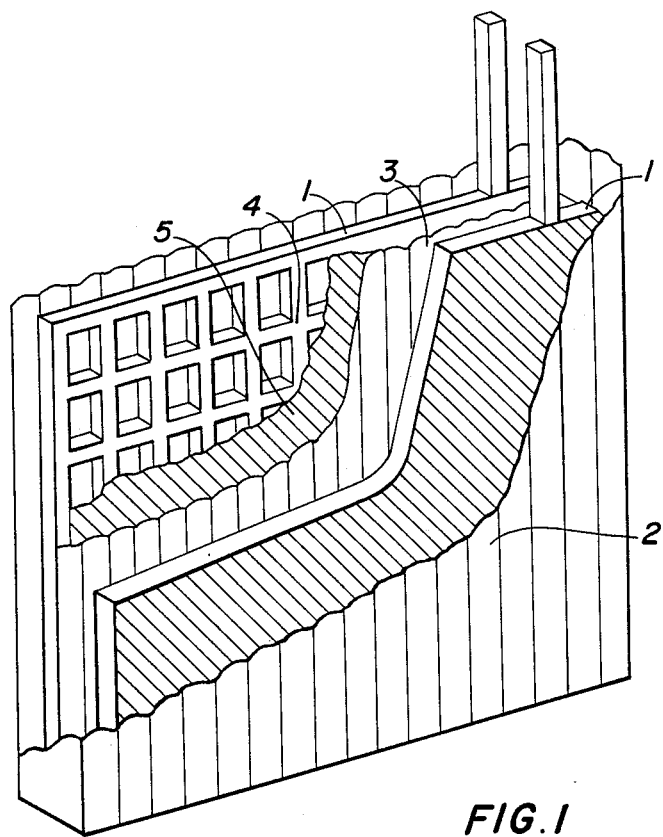
FIG. 1 represents a perspective view of one stack of the recombination device of the invention, shown in partially cut-away view.

The device of FIG. 1 for recombining hydrogen and oxygen released in a lead-acid storage battery as well as their electrochemical conversion comprises two electrodes 1 sheathed in a microporous envelope 2 and separated by a microporous separator element 3. Each of the electrodes 1 comprises a grid structure 4 formed of lead on both sides of which is pressed a layer 5 made of a catalyst/binder mixture.

Figure 2:
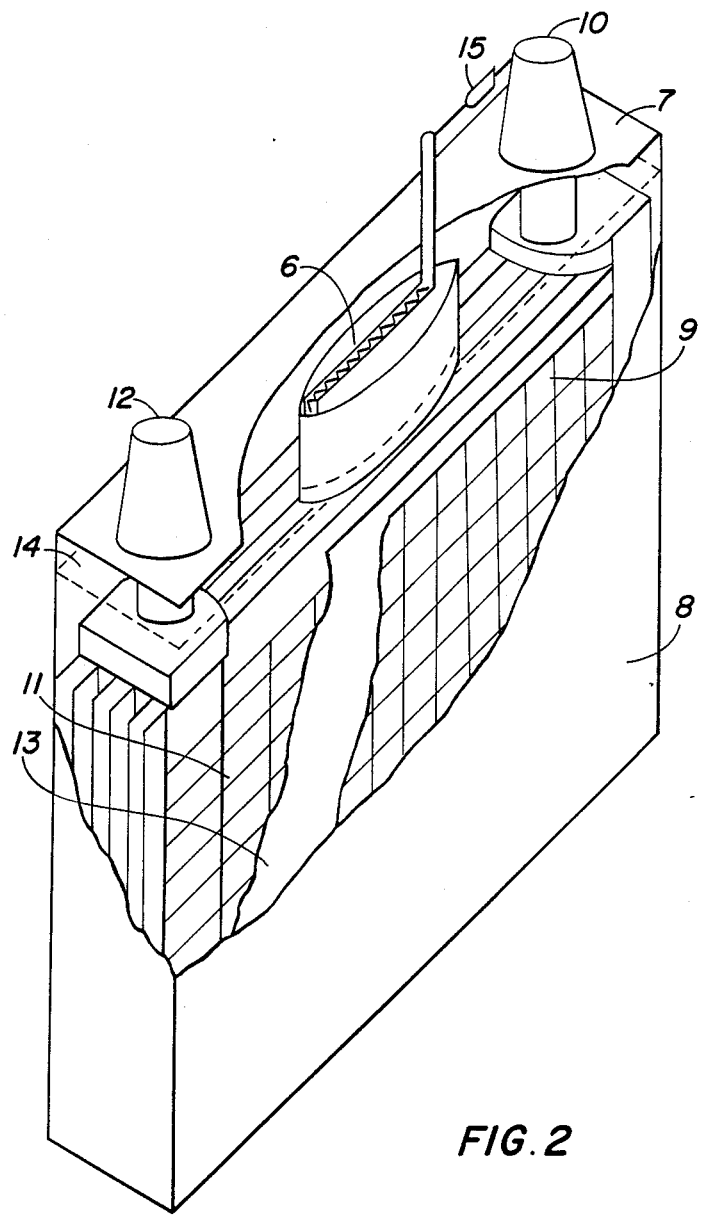
FIG. 2 represents a perspective view of a single storage battery cell with a recombination device of the invention mounted therein, the cell being shown in partially cut-away view.
Figure 3:
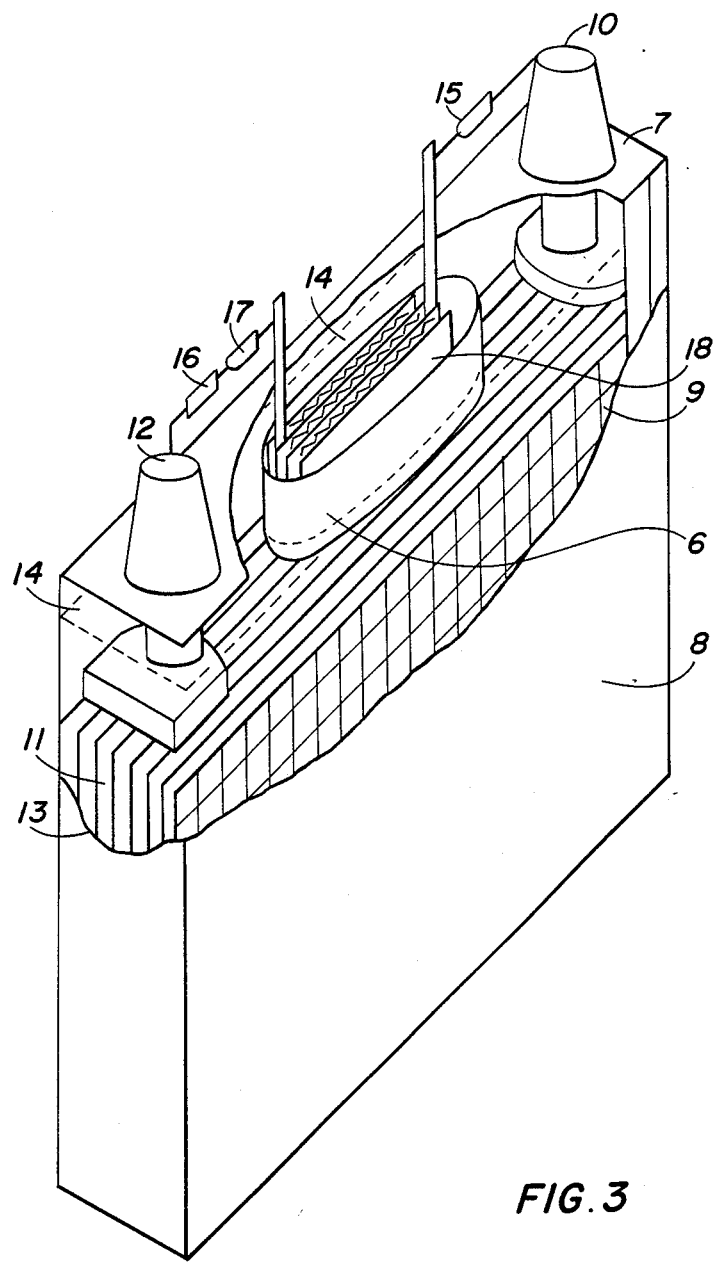
FIG. 3 represents a perspective view of a single storage battery cell with a recombination device divided in two parts of the invention mounted therein, the cell being shown in partially cut-away view.

The electrode stack of the recombination device is identifiable in FIGS. 2 and 3 by the reference numeral 6. It can be seen to be mounted in lid 7 of a storage battery cell 8 comprising negative plates 9 connected to a negative pole 10 and separators 13 separating negative plates 9 from the positive plates 11 which are connected to the positive pole 12. The electrode stack of the device of FIG. 1 is partially immersed in the electrolyte 14 as shown in FIGS. 2 and 3 and is connected to the negative pole 10 through diode 15.

In the basic embodiment, the stack 6 is divided in two parts as shown in FIG. 3 and the electrodes of these two parts of the stack are laid one after the other or they are interleaved. One part of the stack 18 is connected through diode 15 to the negative pole 10, while the other part of the stack 19 is connected through diode 17 and resistor 16 to the positive pole 12.

The following Examples illustrate this invention:

EXAMPLE 1

A hydrogen and oxygen recombination device of the type shown in FIG. 1 but comprising a stack of three electrodes 1 wrapped in a microporous envelope 2 of polyvinylchloride is partially immersed in electrolyte 14 of the cell of FIG. 2 to be disposed over the plates 9 and the positive plates 11 and it is connected by means of diode 15 to the negative pole 10 of the battery cell 8. The electrodes 1 of the recombination device contain 100 mg tungsten carbide/cm$^2$ and 25 mg polytetrafluorethylene/carbon black/cm$^2$ and are each pressed onto a lead grid at 320° C.

The lead storage battery cell 8 in FIG. 2 contains positive plates 11 and negative plates 9 manufactured from grids of Pb-Sb alloy. Ten charge-discharge cycles (5 hours charge at a constant voltage of 2.4 V and 1 hour discharge at a current of 10 A) were carried out with this cell. After these cycles the cell 8 was left under conditions of permanent charge for 1000 hours at a voltage of 2.4 V. Under these conditions the recombination device caused all gases released to be combined indicating that the cell was entirely sealed. Under the same testing conditions but without the recombining device 6, the cell released 0.137 liters of gas per hour.

EXAMPLE 2

Example 1 was repeated but with the difference that the electrodes 1 of the recombination device 6 contained in addition 20 mg carbon/cm$^2$ activated by 10% by weight of cobalt dibenzotetraazaannulene.

The recombination device was mounted in a battery cell which was the same as that described in Example 1 and the tests of Example 2 were performed under the same conditions. The recombination device was successful in combining all gases released.

EXAMPLE 3

The two electrodes 1 of the recombination device of FIG. 1 were made up to contain 300 mg tungsten carbide/cm$^2$, 10 mg active carbon/cm$^2$ and 36 mg polytetrafluorethylene/carbon black/cm$^2$ having been pressed onto the lead grids as in Example 1 at 320° C.

The recombination device was mounted in the storage battery of FIG. 2 and tests were carried out under continuous charging, using a current of 3 A over a 4000 hour test period. All gases released were recombined fully.

EXAMPLE 4

This Example differs from Example 3 in that the electrodes 1 of the recombination device contained, instead of 10 mg active carbon per cm$^2$, only 5 mg of carbon activated by 20% by weight of cobalt methoxyphenylporphyrin which had been pyrolized at 800° C.

Testing was carried out as in Example 3. The recombination device recombined all gases released.

EXAMPLE 5

This Example differs from Example 3 in that the binder was 60 mg polyethylene/cm$^2$ and the electrode mixture was pressed onto a lead grid at 150° C. The test conditions and the results were the same as in Example 3.

EXAMPLE 6

This Example differs from Example 3 in that the binder was 80 mg polypropylene/cm$^2$ and the electrode mixture was pressed at 170° C. onto the grid. The test conditions and the results obtained were as in Example 3.

EXAMPLE 7

This Example differs from Example 3 in that a layer of 100 mg/cm$^2$ carbon black incorporated in polymeric binder polytetrafluorethylene was applied to the support grid and a catalyst/binder mixture, its quantity being the same as in Example 3, was pressed onto this layer. The test conditions and the results were t he same as in Example 3.

EXAMPLE 8

A device for recombining hydrogen and oxygen comprising a stack of 4 electrodes connected two by two as shown in FIG. 3 and enveloped together in a polyvinylchloride microporous separator 2 was partially immersed in the electrolyte of the cell 8 and was mounted over the negative plates 9 and the positive plates 11 of the cell 8. One of the electrode pairs 18 from the stack was connected through a diode 15 to the negative pole 10 of the cell 8, while the other pair 19 was connected by means of a resistor 16 and a diode 17 to the positive pole 12 of the cell. The electrodes 1 of the device 6 contained 200 mg tungsten carbide, 10 mg active carbon and 20 mg polytetrafluorethylene/cm$^2$, each of them being pressed onto a lead grid preliminary treated as in Example 7.

The lead storage battery cell was as given in Example 1. The cell was cycled for 9 hours at current density 4 A and for 3 hours at current density 10 A. Under these conditions, the potential of the pair of electrodes 1 of the device 6 connected to the negative pole 10 was in the range from +0.3 to +0.1 V while the potential of the pair of electrodes 1 connected to the positive pole 12 was in the range from +0.5 to +0.3 V. All gases released in the cell were recombined fully.

Although the invention is described and illustrated with reference to a plurality of embodiments thereof, it is to be expressly understood that it is in no way limited to the disclosure of such preferred embodiments but is capable of numerous modifications within the scope of the appended claims.

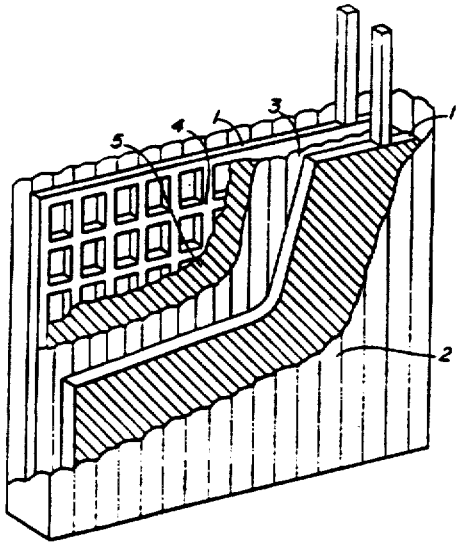

We claim:

1. A device for rendering a lead-acid storage battery maintenance-free and suitable for sealing by recombining and electrochemically converting hydrogen and oxygen released in each battery cell having a positive and a negative pole, said device comprising
   an electrode stack of catalytically active electrodes enveloped in a microporous sheath;
   said electrodes each comprising a catalyst selected from the group consisting of tungsten carbide, a mixture of tungsten carbide and active carbon, and a mixture of tungsten carbide and activated carbon;
   said electrodes each further comprising a binder and a mixture of catalyst and binder being pressed onto a support grid;
   said support grid comprising an element selected from the group consisting of lead and lead alloy;
   each electrode being separated from an adjacent electrode in said stack by a microporous sheet material;
   said electrode stack being divided in two parts, one part being connected by means of a diode to the negative pole and the other part being connected by means of a diode and a resistor to the positive pole;
   said electrode stack being partially immersed in electrolyte;
   the potential of the part of the stack connected to the negative pole being kept between 0.3 and 0.5 V and the potential of the part of the stack connected to the positive pole being kept between 0.1 and 0.3 V versus a hydrogen electrode.

2. A device for rendering a lead-acid storage battery maintenance-free and suitable for sealing by recombining and electrochemically converting hydrogen and oxygen released in each battery cell having a positive and a negative pole, said device comprising
   an electrode stack of catalytically active electrodes enveloped in a microporous sheath;
   said electrodes each comprising a catalyst selected from the group consisting of tungsten carbide, a mixture of tungsten carbide and active carbon, and a mixture of tungsten carbide and activated carbon;
   said electrodes each further comprising a binder and a mixture of catalyst and binder being pressed onto a support grid;

said support grid comprising an element selected from the group consisting of lead and lead alloy;

each electrode being separated from an adjacent electrode in said stack by a microporous sheet material;

said electrodes in said stack being connected to one another;

said electrode stack being connected by means of a diode to the negative pole;

said electrode stack being partially immersed in electrolyte;

the potential of the device being kept at 0.3 ±0.2 V versus a hydrogen electrode.

3. A device as claimed in claim 1 or 2 wherein the catalytically active electrode comprises carbon activated by an element selected from the group consisting of a metal-chelate compound and its product of thermal treatment in a non-oxygen containing medium at a temperature of from 300° to 1000° C.

4. A device as claimed in claim 3, wherein the metal-chelate compound is selected from the group consisting of annulene and porphyrin.

5. A device as claimed in claim 3, wherein the metal-chelate compound has been applied in an amount up to 20% by weight of carbon.

6. A device as claimed in claim 1 or 2, wherein the binder comprises an element selected from the group consisting of polytetrafluorethylene, polytrifluorethylene, polyethylene, polyisobutylene, and polypropylene.

7. A device as claimed in claim 1 or 2, wherein the binder comprises an element selected from the group consisting of carbon black and activated carbon.

8. A device as claimed in claim 1 or 2, wherein the binder constitutes from 5 to 60% by weight of said mixture.

9. A device as claimed in claim 1 or 2, wherein the catalyst and binder are homogeneously distributed in the electrode, the catalyst/binder mixture being pressed onto the grid at preferably 50° to 400° C. in the amount of from 0.01 to 1 g/cm$^2$.

10. A device as claimed in claim 9, wherein the catalyst/binder mixture is distributed in two layers in amount from 0.01 to 1.0 g catalyst/cm$^2$;

the two layers are situated at the two electrode surfaces; and a third layer is disposed between the two layers, said third layer comprising 5 to 60% carbon black and polymeric binder, this three-layer electrode being formed by pressing the three layers at a temperature preferably from 50° to 400° C.

11. A device as claimed in claim 1 or 2, wherein the microporous sheath is formed of an element selected from the group consisting of polyvinylchloride, polyethylene, polypropylene and latex-formaldehyde resin.

* * * * *

UNITED STATES PATENT AND TRADEMARK OFFICE
CERTIFICATE OF CORRECTION

PATENT NO.  : 4,925,746

DATED       : May 15, 1990

INVENTOR(S) : Dechkov et al

It is certified that error appears in the above-identified patent and that said Letters Patent is hereby corrected as shown below:

The title page should be deleted to appear as per attached title page.

Signed and Sealed this

Twenty-fifth Day of June, 1991

Attest:

Attesting Officer

HARRY F. MANBECK, JR.

Commissioner of Patents and Trademarks

United States Patent [19]

Dechkov, et al.

[11] Patent Number: 4,925,746

[45] Date of Patent: May 15, 1990

[54] DEVICE FOR RECOMBING HYDROGEN AND OXYGEN RELEASED IN LEAD-ACID STORAGE BATTERIES

[75] Inventors: Dechko P. Dechkov; Todor V. Donchev; Ivan P. Nikolov; Veneta I. Nikolova; Geno P. Papazov; Konstantin M. Petrov, all of Sofia, Bulgaria

[73] Assignee: Zentralna Laboratoria Po Elektrochimicheski Iztochnici Na Tok, Sofia, Bulgaria

[21] Appl. No.: 183,798

[22] Filed: Apr. 20, 1988

Related U.S. Application Data

[63] Continuation-in-part of Ser. No. 109,382, Oct. 15, 1987, abandoned.

[51] Int. Cl.⁵ .................... H07M 10/34; B01J 31/00
[52] U.S. Cl. ............................. 429/57; 429/7; 429/59; 502/152; 502/177
[58] Field of Search .............. 429/1, 7, 57, 59; 502/152, 177

[56] References Cited

U.S. PATENT DOCUMENTS 3,790,410  2/1974  Mund et al. ............. 502/177 X
4,172,808  10/1979  Böhm et al. ............ 502/177
4,810,598  3/1989  Levy et al. ............. 429/57 X

FOREIGN PATENT DOCUMENTS 49-25574  7/1974  Japan ..................... 429/59
49-33817  9/1974  Japan ..................... 429/59
54-15140  2/1979  Japan ..................... 429/59

*Primary Examiner*—Stephen J. Kalafut
*Attorney, Agent, or Firm*—Klein & Vibber

[57] ABSTRACT

A device for recombining hydrogen and oxygen released in maintenance-free lead-acid storage batteries as well as their electrochemical conversion is composed of electrodes employed in a stack enveloped in a sheath of microporous material with the individual electrodes also being separated by such material. The device may be employed in sealed storage batteries when connected through a diode to the negative pole of a cell of the battery. A stack of electrodes may be divided in two parts, one part connected through a diode to the negative pole and the other part connected through a diode and a resistor to the positive pole, at which time the device is immersed partially in the electrolyte of the cell. The electrodes contains a catalyst from a combination of tungsten carbide and the active or activate carbon and a polymeric binder on a support grid of lead or lead alloy, the catalyst/binder mixture having been pressed onto the support grid or forming two layers situated at the surfaces of the electrode. Between these two catalytic layers a third layer composed of carbon black and binder, and containing the support grid, is situated.

11 Claims, 3 Drawing Sheets